(No Model.)
T. T. SCOTT & J. J. SHEAFOR.
APPARATUS FOR FEEDING SAWDUST AND SHAVINGS TO FURNACES.
No. 460,729. Patented Oct. 6, 1891.
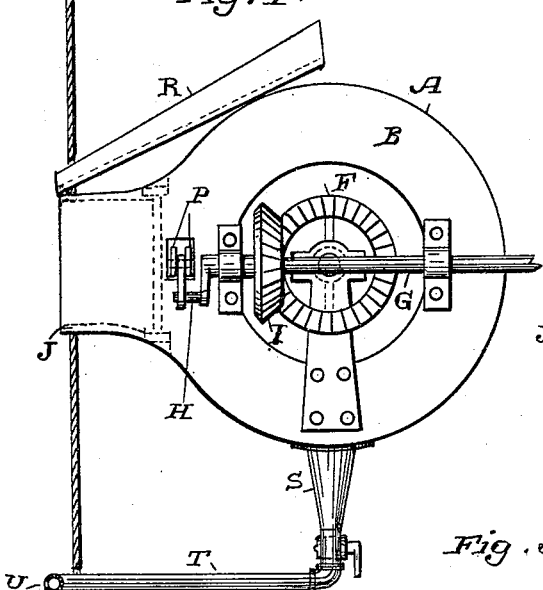
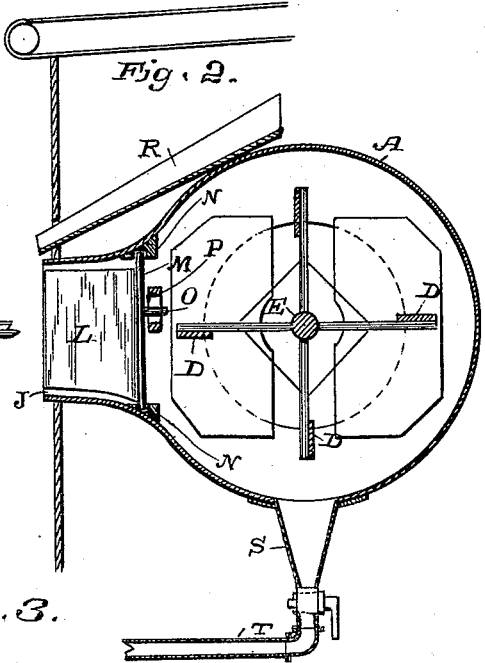
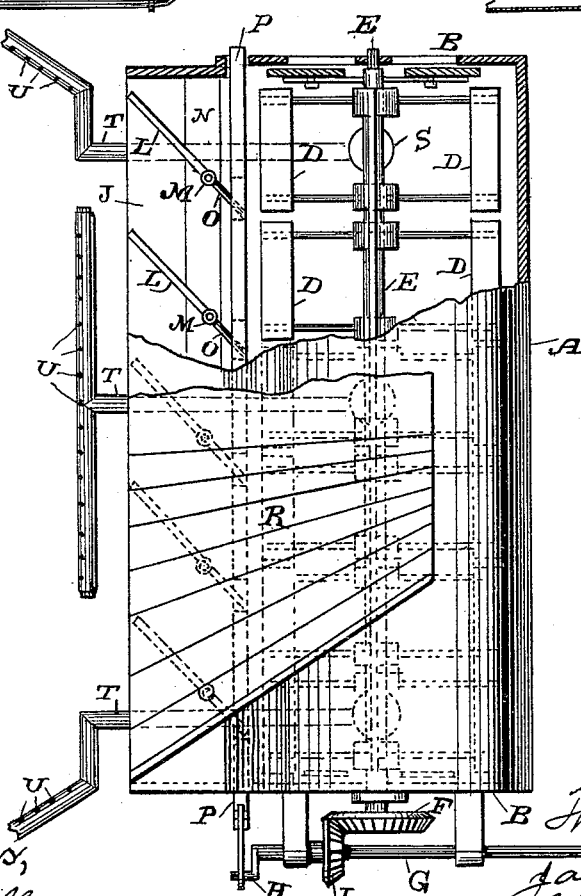
Witnesses,
Inventors,
Thomas T. Scott
Jacob J. Sheafor
By Dewey & Co.
Attys

UNITED STATES PATENT OFFICE.

THOMAS T. SCOTT AND JACOB J. SHEAFOR, OF MOTT, CALIFORNIA.

APPARATUS FOR FEEDING SAWDUST AND SHAVINGS TO FURNACES.

SPECIFICATION forming part of Letters Patent No. 460,729, dated October 6, 1891.

Application filed June 30, 1891. Serial No. 398,068. (No model.)

*To all whom it may concern:*

Be it known that we, THOMAS T. SCOTT and JACOB J. SHEAFOR, citizens of the United States, residing at Mott, Siskiyou county, State of California, have invented an Improvement in Apparatus for Feeding Sawdust and Shavings to Furnaces; and we hereby declare the following to be a full, clear, and exact description of the same.

Our invention relates to an apparatus for feeding sawdust, shavings, and other offal from instruments used in the manufacture of lumber or wooden articles to furnaces, where it is burnt; and our invention consists of the constructions and combinations of devices, which we shall hereinafter fully describe and claim.

Referring to the accompanying drawings for a more complete explanation of our invention, Figure 1 is an end view of our apparatus. Fig. 2 is a section transverse to the shaft. Fig. 3 is a plan view with part of one end of the cylinder broken away to show the interior.

A is a large circular drum having the heads B, and D are fans mounted upon a shaft E and rotated within the drum by the beveled gears F and I. The gear I is mounted upon a shaft G, extending transversely across the end of the drum, and to this shaft power may be applied from any suitable or convenient motor (not here shown) to rotate the fans. Along one side of the drum is a slot or opening J, through which the blast of air is delivered. Within the blast-opening are the oscillating fans L, which project outwardly from vertical shafts M, these shafts being journaled at top and bottom in suitable holes in the brace rods or bars N. From the opposite side of each of these vertical shafts projects an arm O, and all of these arms are connected with a reciprocating bar P, which is actuated by a crank H upon the shaft G, there being a suitable connecting-rod uniting the two. Above the drum is a distributing-chute R, standing at such an angle that the inflammable sawdust or other material will flow down it by gravitation. This chute is made in corrugations or channels which diverge from the upper toward the lower end, and its surface is convex to better distribute the material. The material is delivered from any suitable source into the upper end of this distributing-chute, and the lower end discharges just over the top of the drum and just in front of the air-blast openings, the combustible material being thus distributed and delivered the whole length of the drum. By means of the oscillating fans or distributers L and the blast of air delivered from the slot or openings in the side of the drum this fine material is further distributed and spread out over the whole surface of the fire, the drum being situated at one side of the furnace for this purpose.

In order to assist in the combustion and supply a sufficient quantity of air, we have shown the pipes S leading out from the lower part of the drum and discharging air through the nozzles T. These nozzles may be made in any suitable form. In the present case we have shown one at each end and one in the center, and a cross-tube extends in each direction from the end of this air-supply pipe and is perforated with small holes, as shown at U, so that a considerable blast of air may be delivered to the furnace to assist in the combustion of the fuel.

The device acts rapidly and economically, distributing the fine inflammable material with great evenness and regularity, and the blast of air furnished causes it to burn with extreme rapidity. It is especially useful in sawmills and other mills for working lumber in large quantities, and in which it is a serious mattter to dispose of the waste or offal. It is burned in pits or furnaces, the slabs and heavy material being brought to the furnace by a conveyer above the sawdust-feeder, and the sawdust is distributed over the larger pieces by this machine, which also supplies air for combustion.

Having thus described our invention, what we claim as new, and desire to secure by Letters Patent, is—

1. An apparatus for feeding sawdust and finely-divided fuel to a furnace, consisting of the drum fixed at one side of the furnace, having a horizontal slot made in the edge adjacent thereto, fan-blowers mounted upon a shaft and a mechanism whereby they are rotated within the drum, hinged distributing blades or plates situated in front of the slotted discharge-opening, and a chute through which the material is delivered over the top of the drum so as to fall in front of the distributing-plates and blast-opening, substantially as herein described.

2. An apparatus for feeding sawdust and fine fuel to a furnace, consisting of a drum situated at one side of the furnace, having a slot made horizontally along its length on the side adjacent thereto, fans mounted upon a shaft within the drum and a mechanism whereby said fans are rotated to supply an air-blast, oscillating vanes fixed in the discharge passage or passages in front of the air-supply slot, mechanism whereby they are caused to oscillate from side to side, so as to direct the blast outward and upward and from one side to the other, and a distributing-chute delivering the material to be burned in front of the air-blast passages and oscillating vanes, substantially as herein described.

3. In an apparatus for feeding sawdust and fine fuel to a furnace, a cylindrical drum fixed at one side of the furnace and having a slot extending along the side adjacent thereto, fans mounted upon the shaft and rotating within said drum, distributing-vanes situated in discharge-passages in front of the slot upon the side of the drum, a mechanism whereby the fans are rotated and the vanes are caused to oscillate from side to side, and a chute consisting of diverging channels adapted to receive the fuel at the narrower end and to spread and distribute it toward the discharge end and deliver it above and in front of the air-blast passages and oscillating vanes, substantially as herein described.

4. In an apparatus for feeding sawdust and fine fuel to a pit or furnace, a cylindrical drum fixed at one side of the furnace, having slot and discharge passages adjacent thereto, a shaft extending through the drum and having fans fixed thereto, oscillating vanes pivoted within the discharge-passages in front of the air-slot, a mechanism whereby the fans are rotated and the vanes are oscillated from side to side, a diverging delivery and distributing chute whereby the material to be burned is delivered above and in front of the air-blast passages of the drum, and supplemental air-supplying pipes S, with openings or perforations through which air is conveyed independently from the drum and delivered to assist combustion within the furnace, substantially as herein described.

In witness whereof we have hereunto set our hands.

THOMAS T. SCOTT.
JACOB J. SHEAFOR.

Witnesses:
JOHN DARWIN,
JOHN O. WELSH.